United States Patent
Leao et al.

(10) Patent No.: US 12,105,743 B2
(45) Date of Patent: Oct. 1, 2024

(54) IDENTIFYING DIGITAL ELEMENTS

(71) Applicant: Hewlett-Packard Development Company, L.P., Spring, TX (US)

(72) Inventors: Carlos Leao, Porto Alegre (BR); Lucio Cossio, Porto Alegre (BR); Diogo Schneider, Porto Alegre (BR); Tais Bellini, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 507 days.

(21) Appl. No.: 15/733,788

(22) PCT Filed: Aug. 24, 2018

(86) PCT No.: PCT/US2018/047853
§ 371 (c)(1),
(2) Date: Oct. 26, 2020

(87) PCT Pub. No.: WO2020/040780
PCT Pub. Date: Feb. 27, 2020

(65) Prior Publication Data
US 2021/0248168 A1    Aug. 12, 2021

(51) Int. Cl.
| | |
|---|---|
| *G06F 16/332* | (2019.01) |
| *G06F 16/33* | (2019.01) |
| *G06F 16/335* | (2019.01) |
| *G10L 15/18* | (2013.01) |
| *G10L 15/22* | (2006.01) |

(52) U.S. Cl.
CPC ...... *G06F 16/3329* (2019.01); *G06F 16/3326* (2019.01); *G06F 16/3344* (2019.01); *G06F 16/335* (2019.01); *G10L 15/1822* (2013.01); *G10L 15/22* (2013.01); *G10L 2015/223* (2013.01)

(58) Field of Classification Search
CPC .. G06F 16/33; G06F 16/3325; G06F 16/3326; G06F 16/3329; G06F 16/3344; G06F 16/335; G10L 15/1822; G10L 15/22; G10L 2015/223; G06N 5/00
See application file for complete search history.

(56) References Cited

U.S. PATENT DOCUMENTS

| | | |
|---|---|---|
| 7,840,405 B1 | 11/2010 | Lee et al. |
| 8,358,749 B2 | 1/2013 | Chang et al. |
| 8,639,716 B2 * | 1/2014 | Volkert ................ G06F 16/732 705/26.1 |
| 9,298,811 B2 | 3/2016 | Akolkar et al. |
| 9,734,839 B1 * | 8/2017 | Adams ................... G10L 21/00 |
| 9,792,356 B2 | 10/2017 | Singh |
| 9,858,925 B2 | 1/2018 | Gruber et al. |
| 9,971,772 B2 | 5/2018 | Patel et al. |
| 10,418,032 B1 * | 9/2019 | Mohajer ............ G10L 15/1815 |

(Continued)

*Primary Examiner* — Dino Kujundzic
(74) *Attorney, Agent, or Firm* — Michael Dryja

(57) ABSTRACT

Examples disclosed herein relate to receiving a query from a user associated with a requested digital element, determining whether the query comprises an attribute associated with the requested digital element, identifying at least one digital element comprising the attribute, determining whether the requested digital element can be identified from the at least one digital element, and performing an action on the requested digital element according to the query.

17 Claims, 3 Drawing Sheets

(56) References Cited

U.S. PATENT DOCUMENTS

| | | | |
|---|---|---|---|
| 10,672,379 B1* | 6/2020 | Ellert | G06F 3/162 |
| 2002/0038213 A1* | 3/2002 | Adachi | G06Q 10/02 |
| | | | 706/50 |
| 2007/0174350 A1* | 7/2007 | Pell | G06F 9/451 |
| 2010/0114944 A1 | 5/2010 | Adler | |
| 2012/0265528 A1* | 10/2012 | Gruber | G10L 15/183 |
| | | | 704/235 |
| 2013/0332168 A1 | 12/2013 | Kim et al. | |
| 2014/0040748 A1* | 2/2014 | Lemay | G06F 3/04817 |
| | | | 715/728 |
| 2014/0074466 A1* | 3/2014 | Sharifi | G10L 15/1815 |
| | | | 704/235 |
| 2014/0136187 A1* | 5/2014 | Wolverton | G10L 15/22 |
| | | | 704/9 |
| 2014/0218372 A1* | 8/2014 | Missig | G06F 3/04883 |
| | | | 345/173 |
| 2014/0361973 A1* | 12/2014 | Raux | G06F 3/013 |
| | | | 715/863 |
| 2015/0248886 A1* | 9/2015 | Sarikaya | G06F 16/3329 |
| | | | 704/257 |
| 2017/0161320 A1 | 6/2017 | Venkataraman | |
| 2017/0178626 A1 | 6/2017 | Gruber | |
| 2017/0358305 A1* | 12/2017 | Kudurshian | G06F 16/685 |
| 2018/0052824 A1* | 2/2018 | Ferrydiansyah | G06N 20/00 |
| 2018/0329993 A1* | 11/2018 | Bedadala | G06F 16/90332 |
| 2018/0336894 A1* | 11/2018 | Graham | G06F 16/685 |

* cited by examiner

IDENTIFYING DIGITAL ELEMENTS

BACKGROUND

Digital elements, such as files, emails, pictures, and the like, are often organized in a hierarchical structure such as a list, directory, and/or folder tree. In some situations, users may need to navigate these structures in order to locate a particular element, such as a specific file.

Figure 1:
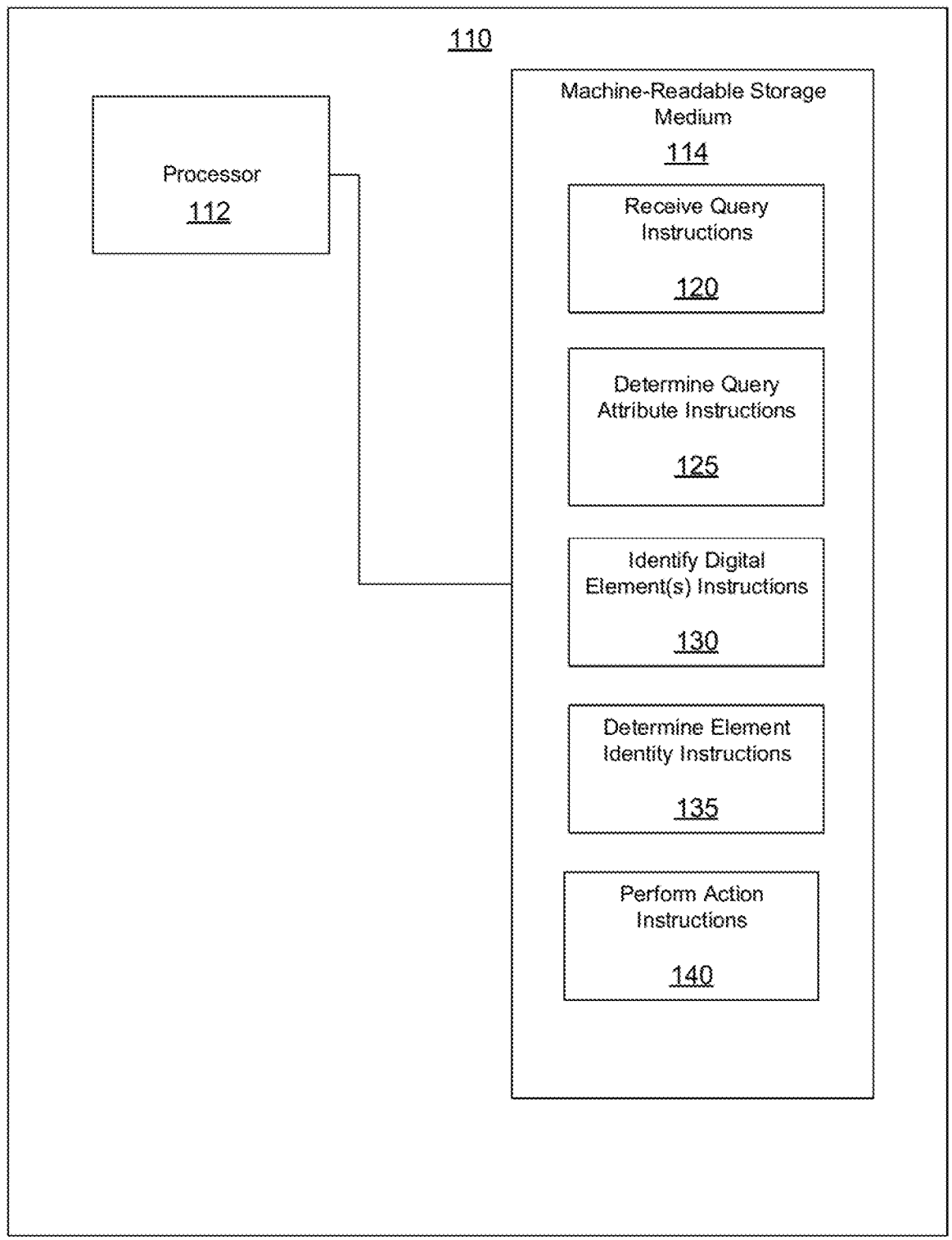
FIG. 1 is a block diagram of an example computing device for identifying digital elements.

Throughout the drawings, identical reference numbers designate similar, but not necessarily identical, elements. The figures are not necessarily to scale, and the size of some parts may be exaggerated to more clearly illustrate the example shown. Moreover the drawings provide examples and/or implementations consistent with the description; however, the description is not limited to the examples and/or implementations provided in the drawings.

DETAILED DESCRIPTION

In some situations, a user may wish to navigate a set of digital elements without access to a typical user interface, such as navigating a directory of folders using a pointing device to click and select elements on a display screen. For example, the user may wish to locate a file on a device that lacks a display of the elements and/or the user may be visually impaired. In such cases, the user may attempt to locate a particular element via alternative means, such as by submitting a query via voice command, gesture, augmented reality interface, and/or textually. For example, a user may speak a command such as "print the last email from Bob" to a voice assistant and/or may select user interface controls in an augmented reality display for a "print" action, an email control, and a contact control associated with another user (e.g., "Bob"). This query may be processed to identify which digital element(s) meet the specified attributes (e.g., element type of "email", from a contact "Bob").

In cases where this identifies the desired element with enough specificity, the requested action (e.g., "print", "save", "email", etc.) may be performed. In other cases, additional information may be requested from the user in order to filter the potentially matching digital elements. For example, several different contacts may be identified as "Bob", so a refining question of "Did you mean Bob Smith or Bob Williams?" may be presented to the user for clarification. Such refinements may continue until the desired element is correctly identified.

In some implementations, the attributes from the query may be used to order the relevance of potential matching elements. For example, a query of "print the last email from Bob" may find recent emails from Bob Smith and Bob Williams and identify those two emails as potentially comprising the requested digital element. The email from Bob Smith may be the most recent of the two, and so may be ordered as the most relevant compared to the email from Bob Williams. The print action may then be taken on the identified element and/or a confirmation (e.g., "Did you mean the email from Bob Smith on Tuesday?") may be presented to the user.

FIG. 1 is a block diagram of an example computing device 110 for identifying digital elements. Computing device 110 may comprise a processor 112 and a non-transitory, machine-readable storage medium 114. Storage medium 114 may comprise a plurality of processor-executable instructions, such as receive query instructions 120, determine query attribute instructions 125, identify digital element(s) instructions 130, determine element identity instructions 135, and perform action instructions 140. In some implementations, instructions 120, 125, 130, 135, 140 may be associated with a single computing device 110 and/or may be communicatively coupled among different computing devices such as via a direct connection, bus, or network.

Processor 112 may comprise a central processing unit (CPU), a semiconductor-based microprocessor, a programmable component such as a complex programmable logic device (CPLD) and/or field-programmable gate array (FPGA), or any other hardware device suitable for retrieval and execution of instructions stored in machine-readable storage medium 114. In particular, processor 112 may fetch, decode, and execute instructions 120, 125, 130, 135, 140.

Executable instructions 120, 125, 130, 135, 140 may comprise logic stored in any portion and/or component of machine-readable storage medium 114 and executable by processor 112. The machine-readable storage medium 114 may comprise both volatile and/or nonvolatile memory and data storage components. Volatile components are those that do not retain data values upon loss of power. Nonvolatile components are those that retain data upon a loss of power.

The machine-readable storage medium 114 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, and/or a combination of any two and/or more of these memory components. In addition, the RAM may comprise, for example, static random access memory (SRAM), dynamic random access memory (DRAM), and/or magnetic random access memory (MRAM) and other such devices. The ROM may comprise, for example, a programmable read-only memory (PROM), an erasable programmable read-only memory (EPROM), an electrically erasable programmable read-only memory (EEPROM), and/or other like memory device.

Receive query instructions 120 may receive a query from a user associated with a requested digital element. In some implementations, the query may be received as a voice query. For example, a user may speak a command such as "print the last email from Bob."

Determine query attribute instructions 125 may determine whether the query comprises an attribute associated with the requested digital element. For example, the query "print the last email from Bob" may identify "email" as a context attribute, "print" as an action attribute, and "last" and "from Bob" as identifying attributes. In a case where insufficient attributes are available to identify even a set of digital elements to search and/or perform an action on, determine query attribute instructions 126 may request additional information from the user. For example, a voice assistant may receive a query of "print that one". Although an action attribute of "print" is present, instructions 125 may not have a context from which to identify which "one", and so may respond with a clarification question such as "What should I print?". In some situations, the same query may have sufficient context and not need clarification. For example, a digital picture frame may be displaying a series of photo images and may receive the same query "print that one"; in such an example, the display of the current picture may provide enough context to identify that picture as the requested digital element on which to perform the action— in this case, printing.

Identify digital element(s) instructions 130 may, in response to determining that the query comprises the attribute associated with the requested digital element, identify at least one digital element comprising the attribute. For the example of "print the email from Bob", the digital element(s) may comprise a plurality of emails from Bob. In some implementations, the digital element(s) may comprise a same type, from which the digital element(s) are identified. For example, the digital elements may comprise types such as document files, pictures, emails, messages, icons, links, etc. In some implementations, the same type of the digital element(s) may be identified by a context of the query. For example, the query may be received in response to another event, such as a received message and/or email, and/or may be received and associated with a particular display, such as a user interface displaying a plurality of images from a photo file library. For example, while displaying a photo library, the query received may comprise "email the third one to Sue". With the context of the photo library, "the third one" may be determined to comprise the third element of type "image" of the plurality of images displayed in a user interface. The context may also be determined from a portion of the query itself. For example, "print the last email from Bob" may rely on the word "email" to identify the type of digital element to identify. The identification may rely on a set of rules and/or grammar based on defined and/or learned words.

For example, a voice assistant may be pre-programmed with a set of action attribute words and a set of type attribute words. Other attributes may be compared against the contents of the digital elements themselves to determine relevance. In some examples, the identification words may be expanded as additional queries are received from the user and/or other users.

In some implementations, in response to determining that the query does not comprise the attribute associated with the digital element, identify digital element instructions 130 may request a clarifying attribute from the user. In some implementations, the clarifying attribute may be selected according to a relevance of a plurality of possible attributes. Each digital element may be associated with various attributes (e.g., for email elements, a sender attribute, a recipient attribute, a date attribute, an attachment attribute, a content attribute, a subject attribute, etc.). The digital elements subject to the query, which may be identified according to the text and/or context of the query, may be analyzed to determine which attributes differentiate the different elements. The differentiating elements may be ranked according to relevance in order to help instructions 130 select the next clarifying attribute to ask about.

For example, the query "print the email from Bob" may result in several emails from different contacts named "Bob". A clarification attribute may be requested, for example by asking the user "Which Bob? Bob Smith or Bob Williams?". In some implementations, using the relevance described above, instructions 130 may identify that the user more frequently communicates with Bob Smith than Bob Williams, such as by determining that several emails have been received from Bob Smith in the same time period as only one email was received from Bob Williams. In such an example, the request for a clarifying attribute may be framed as "Did you mean Bob Smith?" to simplify the process for the user.

In other examples, the user's previous responses and queries may be used to order the relevance of the attributes and/or digital elements. If the user frequently submits queries related to elements associated with Bob Smith, instructions 130 may focus on those elements when attempting to identify the requested digital element and clarifying attributes may be based on those attributes that differentiate between elements associated with Bob Smith instead of trying to identify which Bob to focus on.

For another example, a clarification attribute may be requested by asking "Which email from Bob? The one from today or the one from Tuesday?". Based on the context, various rules may be used to provide an order of relevance for the digital elements. For email type elements, for example, a contact named Bob who emails the user often may be ordered higher in relevance over a second contact named Bob who has only emailed the user a few times. Similarly, more recently received emails may be ordered higher in relevance than older emails.

Determine element identity instructions 135 may determine whether the requested digital element can be identified from the digital element(s). In some implementations, the attribute may comprise a differentiating attribute among the digital element(s), allowing for identification of a specific digital element. For example, a query of "print the last email from Bob" may allow identify digital element instructions 130 to determine, from the context "email" in the query, that the type of digital element to be identified as an email. The query may then use the attribute of "from Bob" to filter a plurality of emails to those received from a user named "Bob". Finally, determine element identity instructions 135 may use the attribute "last" to identify with specificity which of the emails from Bob is meant by the user. Other attributes in the email type context may comprise, for example, a subject, an email address, a name, a message content, a date, and an attachment presence. Other types of elements may use these and/or other attributes to identify specific elements.

In some implementations, in response to determining that the requested digital element cannot be identified from the digital element(s), determine element identity instructions 135 may request a clarifying attribute from the user. For example, the query "print the email from Bob" may result in several emails from different contacts named "Bob". A clarification attribute may be requested, for example by asking the user "Which Bob? Bob Smith or Bob Williams?". For another example, a clarification attribute may be requested by asking "Which email from Bob? The one from today or the one from Tuesday?".

Perform action instructions 140 may, in response to determining that the requested digital element can be identified from the digital element(s), perform an action on the requested digital element according to the query. For example, an action attribute of "print" may result in the requested digital element being sent to a printer associated with the user, such as a default printer and/or a printer specified by the query.

Figure 2:
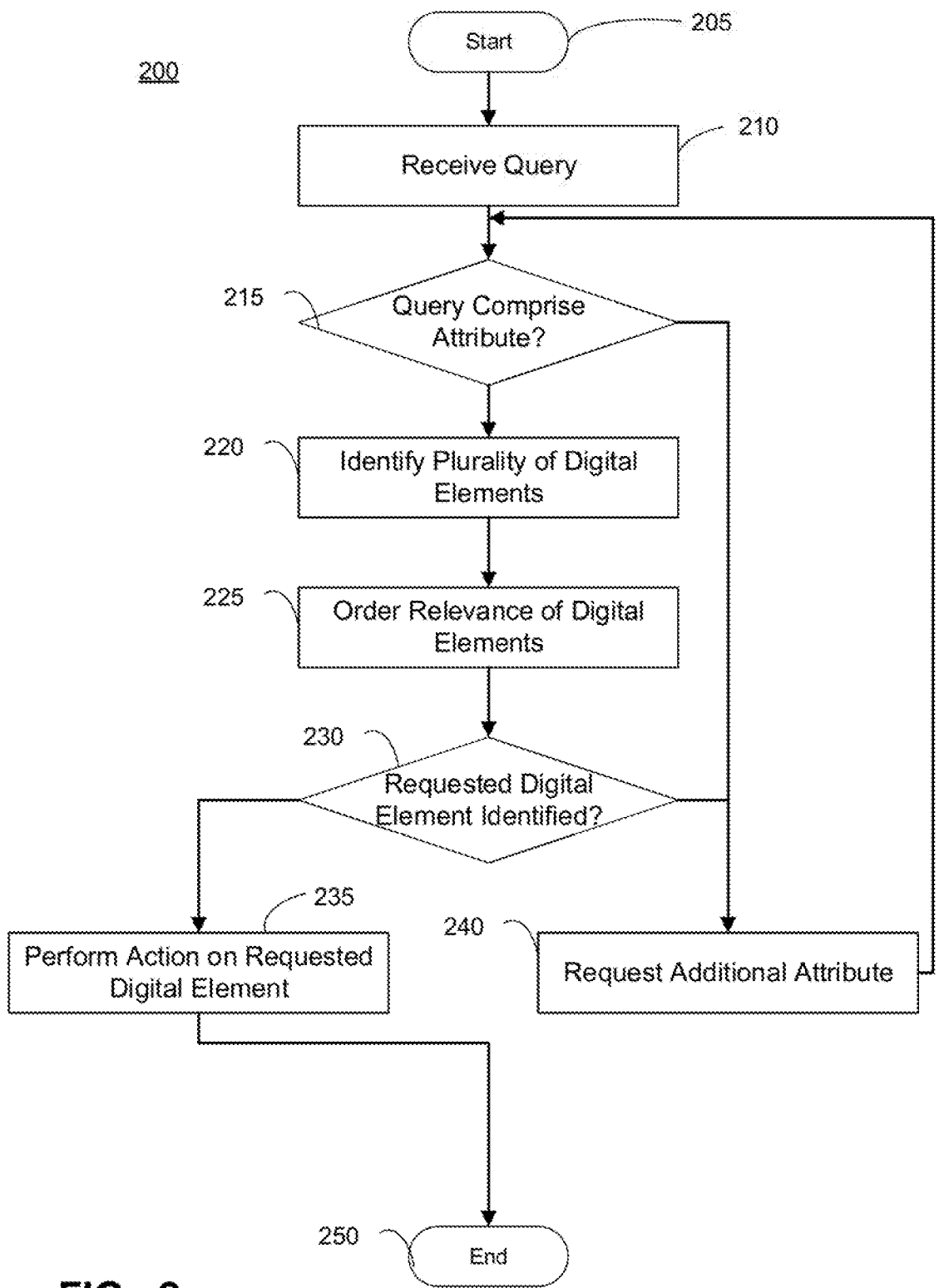
FIG. 2 is a flowchart of an example method for identifying digital elements.

FIG. 2 is a flowchart of an example method 200 for consumable characteristic identification. Although execution of method 200 is described below with reference to computing device 110, other suitable components for execution of method 200 may be used.

Method 200 may begin at stage 205 and advance to stage 210 where device 110 may receive a query from a user associated with a requested digital element. For example, device 110 may execute receive query instructions 120 to receive a query from a user associated with a requested digital element. In some implementations, the query may be received as a voice query. For example, a user may speak a command such as "print the last email from Bob."

Method 200 may then advance to stage 215 where computing device 110 may determine whether the query comprises an attribute associated with the requested digital element. For example, device 110 may execute determine query attribute instructions 125 to determine whether the query comprises an attribute associated with the requested digital element. For example, the query "print the last email from Bob" may identify "email" as a context attribute, "print" as an action attribute, and "last" and "from Bob" as identifying attributes. In a case where insufficient attributes are available to identify even a set of digital elements to search and/or perform an action on, determine query attribute instructions 126 may request additional information from the user.

For example, a voice assistant may receive a query of "print that one". Although an action attribute of "print" is present, instructions 125 may not have a context from which to identify which "one", and so may respond with a clarification question such as "What should I print?". In some situations, the same query may have sufficient context and not need clarification. For example, a digital picture frame may be displaying a series of photo images and may receive the same query "print that one"; in such an example, the display of the current picture may provide enough context to identify that picture as the requested digital element on which to perform the action—in this case, printing.

In response to determining that the query comprises the attribute associated with the digital element, method 200 may then advance to stage 220 where computing device 110 may identify a plurality of digital elements comprising the attribute. For example, device 110 may execute identify digital element(s) instructions 130 to identify at least one digital element comprising the attribute. For the example of "print the email from Bob", the digital element(s) may comprise a plurality of emails from Bob. In some implementations, the digital element(s) may comprise a same type, from which the digital element(s) are identified. For example, the digital elements may comprise types such as document files, pictures, emails, messages, icons, links, etc. In some implementations, the same type of the digital element(s) may be identified by a context of the query. For example, the query may be received in response to another event, such as a received message and/or email, and/or may be received and associated with a particular display, such as a user interface displaying a plurality of images from a photo file library. For example, while displaying a photo library, the query received may comprise "email the third one to Sue". With the context of the photo library, "the third one" may be determined to comprise the third element of type "image" of the plurality of images displayed in a user interface. The context may also be determined from a portion of the query itself. For example, "print the last email from Bob" may rely on the word "email" to identify the type of digital element to identify. The identification may rely on a set of rules and/or grammar based on defined and/or learned words.

Method 200 may then advance to stage 225 where computing device 110 may order the relevance of the plurality of digital elements comprising the attribute according to the query. For example, based on the context, various rules may be used to provide an order of relevance for the digital elements. For email type elements, for example, a contact named Bob who emails the user often may be ordered higher in relevance over a second contact named Bob who has only emailed the user a few times. Similarly, more recently received emails may be ordered higher in relevance than older emails. In some implementations, ordering the relevance of the plurality of digital elements may comprise applying at least one sorting rule to a word of the query. For example, a sorting rule may order the digital elements alphabetically and/or by time stamps.

In some implementations, ordering the relevance of the plurality of digital elements may comprise filtering the plurality of digital elements to a subset of the plurality of digital elements. For example, once ordered, the plurality of digital elements may be filtered to the top 3 results most likely to match the attribute(s) from the query.

Method 200 may then advance to stage 230 where computing device 110 may determine whether the requested digital element can be identified from the plurality of digital elements according to the ordered relevance. For example, device 110 may execute determine element identity instructions 135 to determine whether the requested digital element can be identified from the digital element(s). In some implementations, the attribute may comprise a differentiating attribute among the digital element(s), allowing for identification of a specific digital element. For example, a query of "print the last email from Bob" may allow identify digital element instructions 130 to determine, from the context "email" in the query, that the type of digital element to be identified as an email. The query may then use the attribute of "from Bob" to filter a plurality of emails to those received from a user named "Bob". Finally, determine element identity instructions 135 may use the attribute "last" to identify with specificity which of the emails from Bob is meant by the user. Other attributes in the email type context may comprise, for example, a subject, an email address, a name, a message content, a date, and an attachment presence. Other types of elements may use these and/or other attributes to identify specific elements In response to determining that the requested digital element can be identified from the plurality of digital elements, method 200 may then advance to stage 215 where computing device 110 may perform an action on the requested digital element according to the query. For example, device 110 may execute perform action instructions 140 to perform an action on the requested digital element according to the query. For example, an action attribute of "print" may result in the requested digital element being sent to a printer associated with the user, such as a default printer and/or a printer specified by the query.

In some implementations, in response to determining that the requested digital element cannot be identified from the plurality of digital elements according to the ordered relevance and/or in response to determining that the query does not comprise the attribute associated with the digital element, method 200 may advance to stage 240 where device 110 may request an additional attribute from the user according to a differentiating attribute according the ordered relevance of the subset of the plurality of digital elements. For example, device 110 may execute identify digital element instructions 130 to request a clarifying attribute from the user. For example, the query "print the email from Bob" may result in several emails from different contacts named "Bob". A clarification attribute may be requested, for example by asking the user "Which Bob? Bob Smith or Bob Williams?". For another example, a clarification attribute may be requested by asking "Which email from Bob? The one from today or the one from Tuesday?". In some implementations, after requesting the additional attribute, method 200 may return to stage 215 and/or stage 230 to determine if the requested digital element may be identified.

Method 200 may then end at stage 250.

Figure 3:
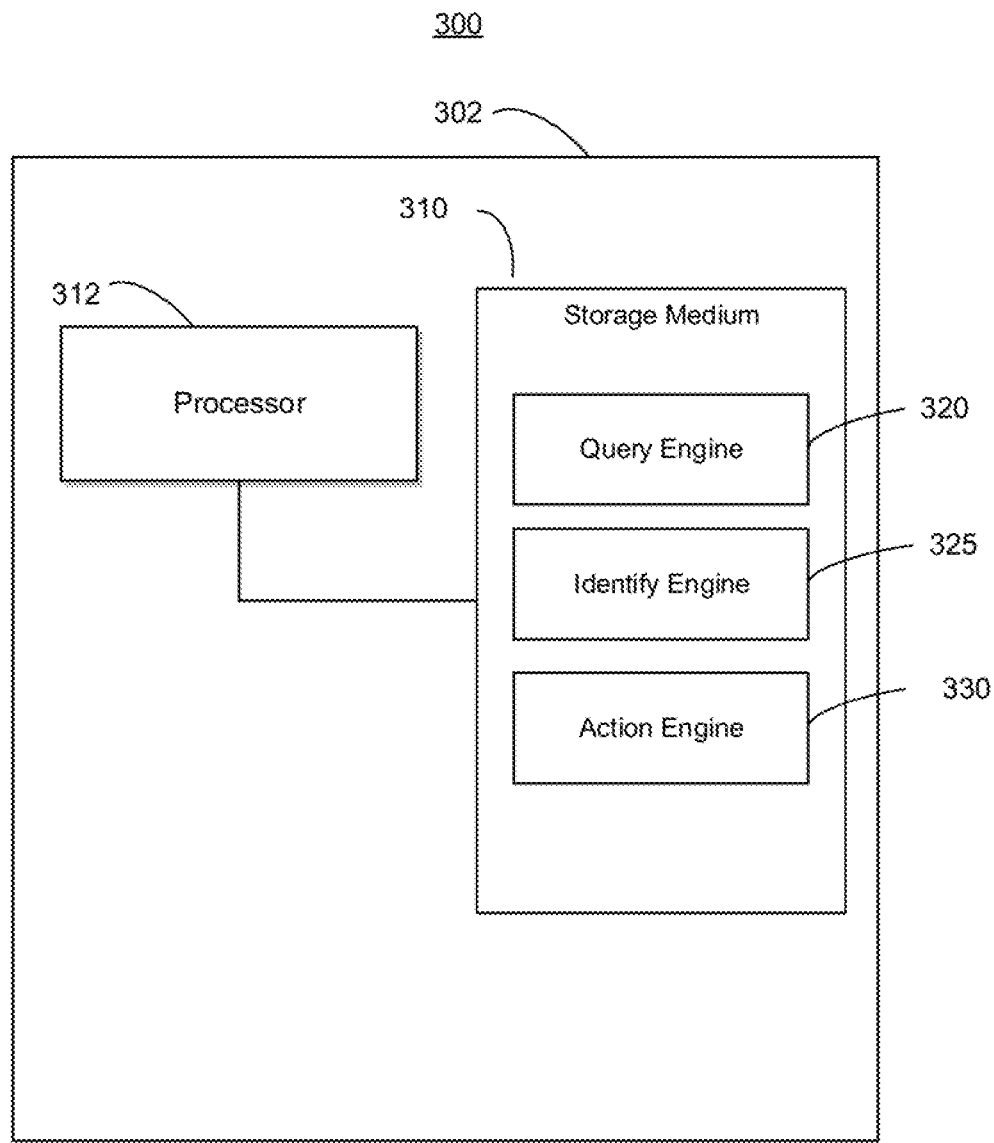
FIG. 3 is a block diagram of an example system for identifying digital elements.

FIG. 3 is a block diagram of an example apparatus 300 for providing consumable characteristic identification. Apparatus 300 may comprise a multi-function printer device 302 comprising a storage medium 310, and a processor 312. Device 302 may comprise and/or be associated with, for example, a general and/or special purpose computer, server, mainframe, desktop, laptop, tablet, smart phone, game console, printer, multi-function device, and/or any other system capable of providing computing capability consistent with providing the implementations described herein. Device 302 may store, in storage medium 310, a query engine 320, a identify engine 325, and an action engine 330.

Each of engines 320, 325, 330 may comprise any combination of hardware and programming to implement the functionalities of the respective engine. In examples described herein, such combinations of hardware and programming may be implemented in a number of different ways. For example, the programming for the engines may be processor executable instructions stored on a non-transitory machine-readable storage medium and the hardware for the engines may include a processing resource to execute those instructions. In such examples, the machine-readable storage medium may store instructions that, when executed by the processing resource, implement engines 320, 325, 330. In such examples, device 302 may comprise the machine-readable storage medium storing the instructions and the processing resource to execute the instructions, or the machine-readable storage medium may be separate but accessible to apparatus 300 and the processing resource.

Query engine 320 may receive a query from a user associated with a requested digital element, parse an attribute associated with the requested digital element from the query, request at least one additional attribute from the user, and parse an action to be performed on the requested digital element from the query. For example, query engine 320 may execute receive query instructions 120 to receive a query from a user associated with a requested digital element. In some implementations, the query may be received as a voice query. For example, a user may speak a command such as "print the last email from Bob." Query engine 320 may further execute determine query attribute instructions 125 to determine whether the query comprises an attribute associated with the requested digital element. For example, the query "print the last email from Bob" may identify "email" as a context attribute, "print" as an action attribute, and "last" and "from Bob" as identifying attributes. In a case where insufficient attributes are available to identify even a set of digital elements to search and/or perform an action on, determine query attribute instructions 126 may request additional information from the user.

In some implementations, in response to determining that the requested digital element cannot be identified from the plurality of digital elements according to the ordered relevance and/or in response to determining that the query does not comprise the attribute associated with the digital element, query engine 320 may request an additional attribute from the user according to a differentiating attribute according the ordered relevance of the subset of the plurality of digital elements. For example, query engine 320 may execute identify digital element instructions 130 to request a clarifying attribute from the user. For example, the query "print the email from Bob" may result in several emails from different contacts named "Bob". A clarification attribute may be requested, for example by asking the user "Which Bob? Bob Smith or Bob Williams?". For another example, a clarification attribute may be requested by asking "Which email from Bob? The one from today or the one from Tuesday?". In some implementations, after requesting the additional attribute, method 200 may return to stage 215 and/or stage 230 to determine if the requested digital element may be identified.

Identify engine 325 may identify a plurality of digital elements based on the query, order the relevance of the plurality of digital elements comprising the attribute according to the query, and filter the plurality of digital elements to the requested digital element. In some implementations, identify engine 320 may identify a plurality of digital elements comprising the attribute. For example, query engine 320 may execute identify digital element(s) instructions 130 to identify at least one digital element comprising the attribute. For the example of "print the email from Bob", the digital element(s) may comprise a plurality of emails from Bob. In some implementations, the digital element(s) may comprise a same type, from which the digital element(s) are identified. For example, the digital elements may comprise types such as document files, pictures, emails, messages, icons, links, etc. In some implementations, the same type of the digital element(s) may be identified by a context of the query. For example, the query may be received in response to another event, such as a received message and/or email, and/or may be received and associated with a particular display, such as a user interface displaying a plurality of images from a photo file library. For example, while displaying a photo library, the query received may comprise "email the third one to Sue". With the context of the photo library, "the third one" may be determined to comprise the third element of type "image" of the plurality of images displayed in a user interface. The context may also be determined from a portion of the query itself. For example, "print the last email from Bob" may rely on the word "email" to identify the type of digital element to identify. The identification may rely on a set of rules and/or grammar based on defined and/or learned words.

In some implementations, identify engine 325 may order the relevance of the plurality of digital elements comprising the attribute according to the query. For example, based on the context, various rules may be used to provide an order of relevance for the digital elements. For email type elements, for example, a contact named Bob who emails the user often may be ordered higher in relevance over a second contact named Bob who has only emailed the user a few times. Similarly, more recently received emails may be ordered higher in relevance than older emails. In some implementations, ordering the relevance of the plurality of digital elements may comprise applying at least one sorting rule to a word of the query. For example, a sorting rule may order the digital elements alphabetically and/or by time stamps. In some implementations, ordering the relevance of the plurality of digital elements may comprise filtering the plurality of digital elements to a subset of the plurality of digital elements. For example, once ordered, the plurality of digital elements may be filtered to the top 3 results most likely to match the attribute(s) from the query.

Action engine 330 may cause the action parsed from the query to be performed on the requested digital element. For example, action engine 330 may perform an action on the requested digital element according to the query and/or may instruct another component (e.g., a printer) to perform the action. For example, device 110 may execute perform action instructions 140 to perform an action on the requested digital element according to the query. For example, an action attribute of "print" may result in the requested digital element being sent to a printer associated with the user, such as a default printer and/or a printer specified by the query.

In the foregoing detailed description of the disclosure, reference is made to the accompanying drawings that form a part hereof, and in which is shown by way of illustration how examples of the disclosure may be practiced. These examples are described in sufficient detail to allow those of ordinary skill in the art to practice the examples of this disclosure, and it is to be understood that other examples may be utilized and that process, electrical, and/or structural changes may be made without departing from the scope of the present disclosure.

What is claimed:

1. A non-transitory machine readable medium storing instructions executable by a processor to:
    receive a query from a user specifying a requested digital element and an action to be performed on the requested digital element;
    after receiving the query, determine that the query comprises a context attribute indicating a type of the requested digital element;
    in response to determining that the query as received comprises the context attribute indicating the type of the requested digital element, identify and retrieve at least one digital element matching the context attribute in that the at least one digital element is of the type indicated by the context attribute;
    after identifying and retrieving the at least one digital element matching the context, determine that the query as received comprises an identifying attribute that identifies the requested digital element from the at least one digital element matching the context attribute; and
    in response to determining that the query as received comprises the identifying attribute that identifies the requested digital element from the at least one digital element:
        order the at least one digital element matching the context attribute according to relevance to the context;
        identify the requested digital element from the at least one digital element matching the context attribute as have been retrieved and ordered, using the identifying attribute; and
        perform the action on the requested digital element as has been identified.

2. The non-transitory machine readable medium of claim 1, wherein the query is received from the user as a voice query.

3. The non-transitory machine readable medium of claim 1, wherein the instructions are executable by the processor to further:
    in response to determining that the query does not comprise the context attribute indicating the type of the requested digital element, request clarification from the user.

4. The non-transitory machine readable medium of claim 3, wherein the instructions are executable by the processor to further:
    in response to determining that the query does not comprise the identifying attribute that identifies the requested digital element from the at least one digital element, request a clarifying attribute from the user.

5. The non-transitory machine readable medium of claim 1, wherein the requested digital element comprises an email.

6. The non-transitory machine readable medium of claim 5, wherein the identifying attribute comprises one or more of the following: a subject, an email address, a name, a message content, a date, and an attachment presence.

7. A system comprising:
    a processor; and
    a memory storing instructions executable by the processor to:
        receive a query from a user specifying a requested digital element and an action to be performed on the requested digital element;
        after receiving the query, determine that the query comprises a context attribute indicating a type of the requested digital element;
        in response to determining that the query as received comprises the context attribute indicating the type of the requested digital element, identify and retrieve at least one digital element matching the context attribute in that the at least one digital element is of the type indicated by the context attribute;
        after identifying and retrieving the at least one digital element matching the context, determine that the query as received comprises an identifying attribute that identifies the requested digital element from the at least one digital element matching the context attribute; and
        in response to determining that the query as received comprises the identifying attribute that identifies the requested digital element from the at least one digital element:
            order the at least one digital element matching the context attribute according to relevance to the context;
            identify the requested digital element from the at least one digital element matching the context attribute as have been retrieved and ordered, using the identifying attribute; and
            perform the action on the requested digital element as has been identified.

8. The system of claim 7, wherein the query is received from the user as a voice query.

9. The system of claim 7, wherein the instructions are executable by the processor to further:
    in response to determining that the query does not comprise the context attribute identifying the type of the requested digital element, request clarification from the user.

10. The system of claim 9, wherein the instructions are executable by the processor to further:
    in response to determining that the query does not comprise the identifying attribute that identifies the requested digital element from the at least one digital element, request a clarifying attribute from the user.

11. The system of claim 7, wherein the requested digital element comprises an email.

12. A method performed by a processor and comprising:

receiving a query from a user specifying a requested digital element and an action to be performed on the requested digital element;

after receiving the query, determining that the query comprises a context attribute indicating a type of the requested digital element;

in response to determining that the query as received comprises the context attribute indicating the type of the requested digital element, identifying and retrieving at least one digital element matching the context attribute in that the at least one digital element is of the type indicated by the context attribute;

after identifying and retrieving the at least one digital element matching the context, determining that the query as received comprises an identifying attribute that identifies the requested digital element from the at least one digital element matching the context attribute; and in response to determining that the query as received comprises the identifying attribute that identifies the requested digital element from the at least one digital element:
ordering the at least one digital element matching the context attribute according to relevance to the context;
identifying the requested digital element from the at least one digital element matching the context attribute as have been retrieved and ordered, using the identifying attribute; and
performing the action on the requested digital element as has been identified.

13. The method of claim 12, wherein the query is received from the user as a voice query.

14. The method of claim 12, further comprising:

in response to determining that the query does not comprise the context attribute indicating the type of the requested digital element, requesting clarification from the user.

15. The method of claim 14, further comprising:

in response to determining that the query does not comprise the identifying attribute that identifies the requested digital element from the at least one digital element, requesting a clarifying attribute from the user.

16. The method of claim 12, wherein the requested digital element comprises an email.

17. The method of claim 16, wherein the identifying attribute comprises one or more of the following: a subject, an email address, a name, a message content, a date, and an attachment presence.

* * * * *